US012547106B2

(12) United States Patent
Ishida et al.

(10) Patent No.: US 12,547,106 B2
(45) Date of Patent: Feb. 10, 2026

(54) IMAGE FORMING APPARATUS

(71) Applicant: KYOCERA Document Solutions Inc., Osaka (JP)

(72) Inventors: Keiju Ishida, Osaka (JP); Takehiro Sato, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/000,099

(22) Filed: Dec. 23, 2024

(65) Prior Publication Data

US 2025/0208549 A1 Jun. 26, 2025

(30) Foreign Application Priority Data

Dec. 25, 2023 (JP) ................................ 2023-217700

(51) Int. Cl.
*G03G 15/20* (2006.01)
*G03G 21/16* (2006.01)

(52) U.S. Cl.
CPC ..... *G03G 15/2053* (2013.01); *G03G 15/2064* (2013.01); *G03G 21/1619* (2013.01); *G03G 21/1633* (2013.01)

(58) Field of Classification Search
CPC ........... G03G 21/1633; G03G 15/2064; G03G 21/1685; G03G 21/1647; G03G 2221/1684
See application file for complete search history.

(56) References Cited

U.S. PATENT DOCUMENTS

| | | | | |
|---|---|---|---|---|
| 8,737,893 | B2 * | 5/2014 | Fujiwara ............ | G03G 15/2032 399/329 |
| 2006/0285893 | A1 * | 12/2006 | Ishii .................. | G03G 15/2039 399/329 |
| 2017/0031281 | A1 * | 2/2017 | Sawamura ......... | G03G 15/2032 |
| 2017/0308010 | A1 * | 10/2017 | Okajima ............ | G03G 15/2053 |
| 2021/0165352 | A1 | 6/2021 | Sato | |

FOREIGN PATENT DOCUMENTS

| | | |
|---|---|---|
| JP | 2021086093 A | 6/2021 |

* cited by examiner

*Primary Examiner* — Jessica L Eley
(74) *Attorney, Agent, or Firm* — Alleman Hall LLP

(57) ABSTRACT

A tilted surface is provided in a heating unit and is tilted with respect to a first direction. A movable member includes a roller and is movable along the first direction. A first direction movement mechanism causes the movable member to move along the first direction in an interlocking manner with a movement of an operation member. When the movable member moves in an interlocking manner with the movement of the operation member in a first operation direction, the roller rolls on the tilted surface to cause the heating unit to move toward a second side against a bias force of a bias member. When the movable member moves in the interlocking manner with the movement of the operation member in a second operation direction, the roller rolls on the tilted surface, and the bias member causes the heating unit to move toward a first side.

5 Claims, 7 Drawing Sheets

IMAGE FORMING APPARATUS

INCORPORATION BY REFERENCE

This application is based upon and claims the benefit of priority from the corresponding Japanese Patent Application No. 2023-217700 filed on Dec. 25, 2023, the entire contents of which are incorporated herein by reference.

BACKGROUND

The present disclosure relates to an image forming apparatus including a fixing unit and a heating unit.

An image forming apparatus that uses electrophotography fixes a toner image onto a sheet using a fixing device.

The fixing device may be sectioned into a fixing unit which includes a fixing member and a pressure roller and a heating unit which includes a heater for heating the fixing member.

Further, the image forming apparatus is known to include a mechanism for moving the heating unit from a heating position to an evacuation position in an interlocking manner with an operation with respect to an operation member. The fixing unit can be drawn out from a main body while the heating unit is evacuated to the evacuation position.

SUMMARY

An image forming apparatus according to an aspect of the present disclosure includes a main body in which an opening is formed, an operation member, a heating unit, a fixing unit, and an interlocking mechanism. The operation member is movable in a first operation direction or a second operation direction by being operated. The fixing unit includes a fixing member and a pressure member that biases a sheet toward the fixing member, is arranged inside the main body, and is capable of being drawn out along a first direction from the main body via the opening. The heating unit includes a heater that heats the fixing member, is arranged on a first side of a second direction that intersects with the first direction with respect to the fixing unit in the main body, and is movable along the second direction. The interlocking mechanism causes the heating unit to move along the second direction in an interlocking manner with a movement of the operation member. The interlocking mechanism includes a tilted surface, a bias member, a movable member, and a first direction movement mechanism. The tilted surface is provided in the heating unit while facing the first side and is tilted from a second side of the second direction toward the first side with respect to the first direction. The bias member biases the heating unit toward the first side. The movable member includes a roller that is supported rotatably and comes into contact with the tilted surface, and is movable along the first direction. The first direction movement mechanism causes the movable member to move along the first direction in the interlocking manner with the movement of the operation member. When the movable member moves in the interlocking manner with the movement of the operation member in the first operation direction, the roller rolls from a portion of the tilted surface on the second side to a portion thereof on the first side to cause the heating unit to move toward the second side against a bias force of the bias member. When the movable member moves in the interlocking manner with the movement of the operation member in the second operation direction, the roller rolls from the portion of the tilted surface on the first side to the portion thereof on the second side, and the bias member causes the heating unit to move toward the first side.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the drawings. It is noted that the following embodiment is an example of embodying the present disclosure and does not limit the technical scope of the present disclosure.

[Configuration of Image Forming Apparatus 10]

An image forming apparatus 10 according to the embodiment executes print processing using electrophotography. The print processing is processing of forming an image on a sheet 900.

Figure 1:
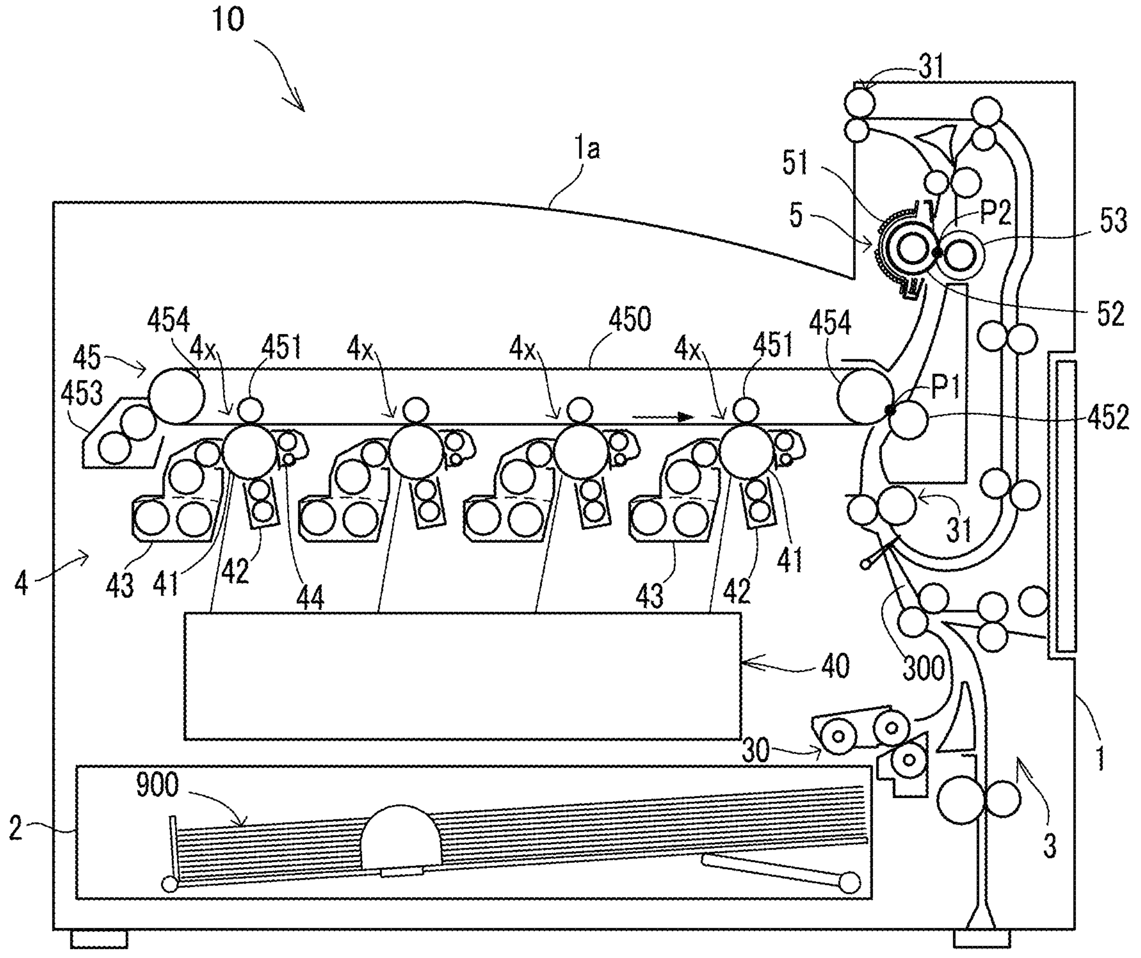
FIG. 1 is a configuration diagram of an image forming apparatus according to an embodiment.

As shown in FIG. 1, the image forming apparatus 10 includes a sheet storing portion 2, a sheet conveying device 3, and a printing device 4. The sheet conveying device 3 and the printing device 4 are housed in a main body 1 as a housing. The main body 1 includes a main body frame 1*x* that constitutes a framework of the main body 1 and an exterior member attached to the main body frame 1*x*.

The sheet storing portion 2 is capable of storing a plurality of sheets 900. The sheet conveying device 3 includes a sheet feed device 30 and a plurality of conveying roller pairs 31.

The sheet feed device 30 feeds the sheets 900 stored in the sheet storing portion 2 one by one to a conveying path 300. The conveying path 300 is a path of the sheets 900.

The plurality of conveying roller pairs 31 convey the sheet 900 along the conveying path 300. One pair out of the plurality of conveying roller pairs 31 discharges the sheet 900 on which an image has been formed onto a discharge tray 1*a* from the conveying path 300.

The printing device 4 executes the print processing on the sheet 900 conveyed along the conveying path 300. The image to be formed on the sheet 900 is a toner image.

The printing device 4 includes a laser scanning unit 40, one or more image forming portions 4*x*, a transfer device 45, and a fixing device 5. The image forming portion 4*x* includes a photoconductor 41, a charging device 42, a developing device 43, and a drum cleaning device 44.

The charging device 42 charges a surface of the photoconductor 41. The laser scanning unit 40 scans beam light on the charged surface of the photoconductor 41. Thus, the laser scanning unit 40 forms an electrostatic latent image on the surface of the photoconductor 41.

By supplying toner to the surface of the photoconductor 41, the developing device 43 develops the electrostatic latent image into a toner image. The transfer device 45 transfers the toner image that has been formed on the surface of the photoconductor 41 onto the sheet 900.

The transfer device 45 transfers the electrostatic latent image onto the sheet 900 at a transfer position P1 on the conveying path 300.

In the present embodiment, the printing device 4 is a tandem-type color printing device that includes a plurality of image forming portions 4*x*. Further, the transfer device 45 includes an intermediate transfer belt 450, a plurality of primary transfer devices 451, a secondary transfer device 452, and a belt cleaning device 453.

In the example shown in FIG. 1, the printing device 4 includes four image forming portions 4*x* respectively corresponding to toner of four colors, that is, yellow, magenta, cyan, and black. The transfer device 45 includes four primary transfer devices 451 respectively corresponding to the four image forming portions 4*x*.

The intermediate transfer belt 450 is rotatably supported by a plurality of supporting rollers 454. One of the plurality of supporting rollers 454 rotates by being driven by a belt drive device (not shown). Thus, the intermediate transfer belt 450 rotates.

Each of the primary transfer devices 451 transfers the toner image formed on the surface of the photoconductor 41 in the corresponding one of the image forming portions 4*x* onto a surface of the intermediate transfer belt 450. Thus, a synthetic toner image obtained by synthesizing the toner images of four colors is formed on the surface of the intermediate transfer belt 450.

The intermediate transfer belt 450 rotates while carrying the synthetic toner image. The secondary transfer device 452 transfers the synthetic toner image that has been formed on the surface of the intermediate transfer belt 450 onto the sheet 900 at the transfer position P1.

The drum cleaning device 44 removes primary waste toner from the surface of the photoconductor 41. The primary waste toner is toner remaining at a portion of the surface of the photoconductor 41, that has passed through the primary transfer device 451.

The belt cleaning device 453 removes secondary waste toner from the surface of the intermediate transfer belt 450. The secondary waste toner is toner remaining at a portion of the surface of the intermediate transfer belt 450, that has passed through the secondary transfer device 452.

The fixing device 5 heats and pressurizes the synthetic toner image on the sheet 900 at a fixing position P2 on the conveying path 300. Thus, the fixing device 5 fixes the synthetic toner image onto the sheet 900. The fixing position P2 is a position on a downstream side of the transfer position P1 in a sheet conveying direction.

Figure 2:
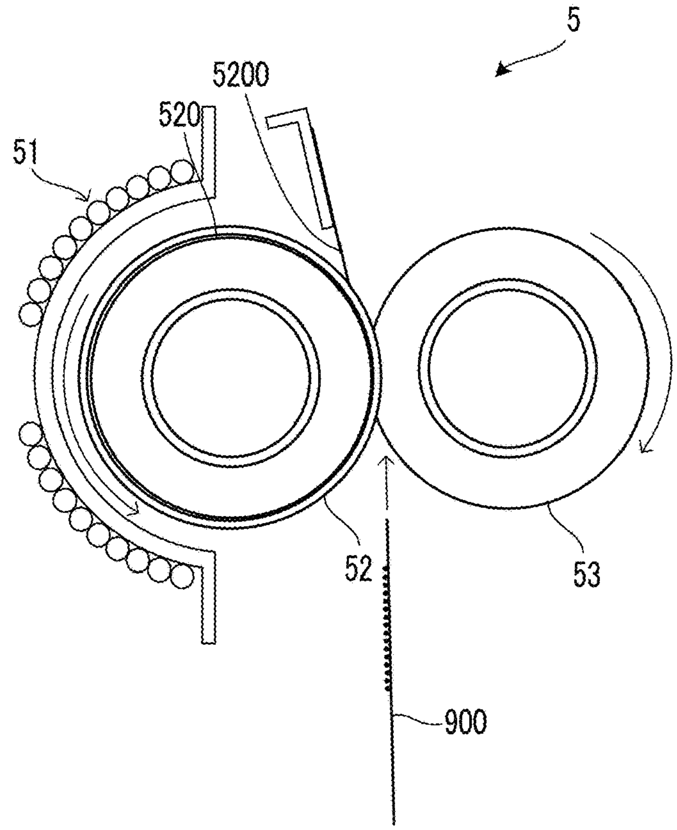
FIG. 2 is a diagram showing a partial configuration of a fixing device in the image forming apparatus according to the embodiment.

As shown in FIG. 2, the fixing device 5 includes a heater 51, a fixing belt 52, a fixing roller 520, a pressure roller 53, and a sheet separation member 5200.

The fixing belt 52 is a flexible cylindrical member including the fixing roller 520 therein. The fixing belt 52 is heated by the heater 51.

The fixing roller 520 is a cylindrical member which supports the fixing belt 52 from an inner side of the fixing belt 52. The fixing roller 520 is supported rotatably. The fixing belt 52 is capable of rotating with the fixing roller 520.

The fixing belt 52 includes a conductive base material, an elastic layer formed on an outer circumference of the base material, and a release layer formed on an outer circumference of the elastic layer.

The heater 51 is arranged so as to oppose an outer circumferential surface of the fixing belt 52. In the present embodiment, the heater 51 is a heating device that uses an induction heating system. The heater 51 mainly heats the base material of the fixing belt 52 by electromagnetic induction.

The pressure roller 53 is supported rotatably. The pressure roller 53 rotates by being driven by a drive device (not shown). The fixing belt 52 and the fixing roller 520 rotate in conjunction with the pressure roller 53.

The fixing belt 52 heats the toner image formed on the sheet 900. The pressure roller 53 biases the sheet 900 toward the fixing belt 52 to thus pressurize the toner image toward the sheet 900.

It is noted that the fixing belt 52 is an example of a fixing member that is heated by the heater 51. The pressure roller 53 is an example of a pressure member that biases the sheet 900 toward the fixing belt 52.

The sheet separation member 5200 peels the sheet 900 off from the fixing belt 52 when the sheet 900 adheres onto the fixing belt 52.

Figure 4:
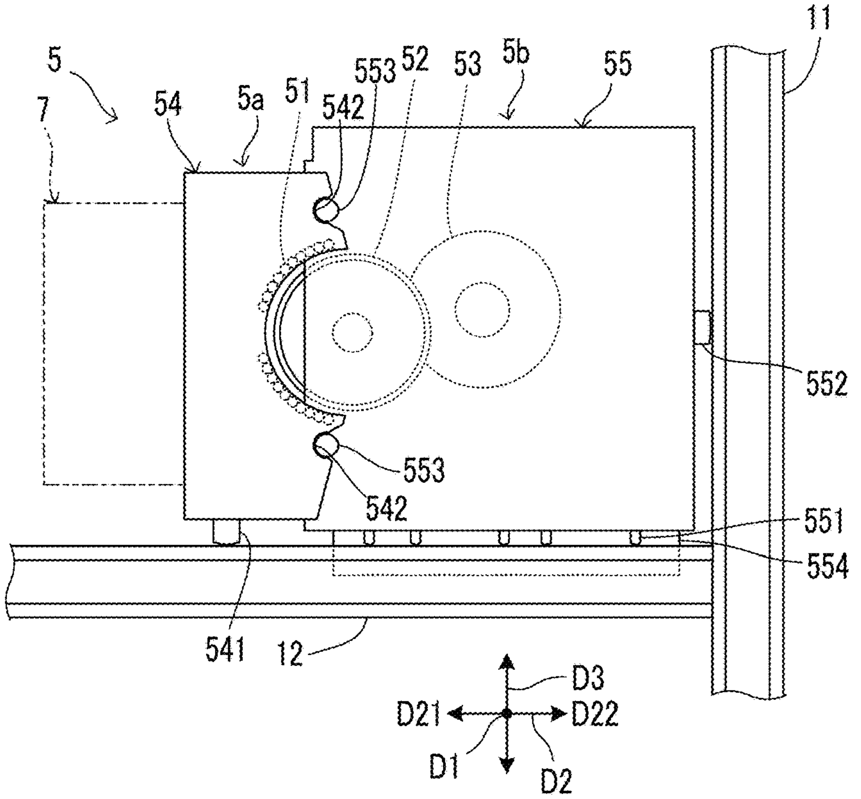
FIG. 4 is a front view of the fixing device in a vicinity state in the image forming apparatus according to the embodiment.
Figure 5:
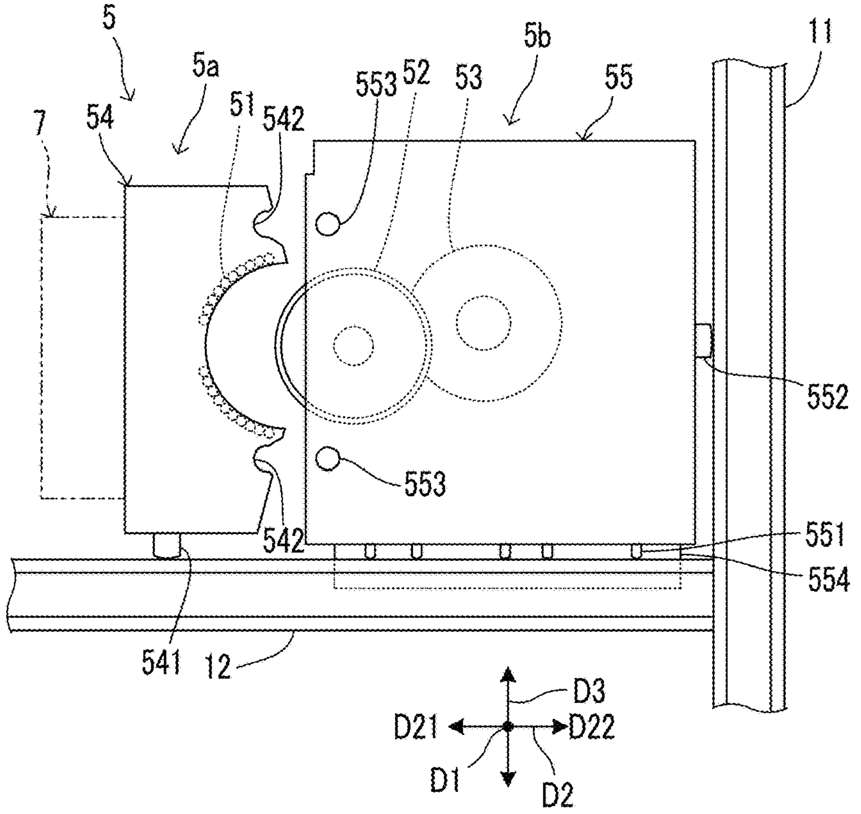
FIG. 5 is a front view of the fixing device in a spaced state in the image forming apparatus according to the embodiment.

In the present embodiment, the fixing device 5 is sectioned into a heating unit 5*a* and a fixing unit 5*b* (see FIG. 4 and FIG. 5). The heating unit 5*a* is arranged along a first direction D1 in the main body 1. The fixing unit 5*b* is also arranged along the first direction D1 in the main body 1.

In other words, the heating unit 5*a* and the fixing unit 5*b* are arranged in a state where longitudinal directions thereof are provided along the first direction D1.

The heating unit 5*a* and the fixing unit 5*b* are arranged next to each other in a second direction D2. In other words, the second direction D2 is an array direction of the heating unit 5*a* and the fixing unit 5*b*. The second direction D2 is a direction that intersects with the first direction D1.

In descriptions below, one side of the second direction D2 will be referred to as a first side D21, and the other side of the second direction D2 will be referred to as a second side D22 (see FIG. 3 to FIG. 5, FIG. 7, and FIG. 8). The heating unit 5*a* is arranged on the first side D21 with respect to the fixing unit 5*b* (see FIG. 4, FIG. 5, FIG. 7, and FIG. 8).

The heating unit 5*a* includes the heater 51 and a first supporting member 54. The fixing unit 5*b* includes the fixing belt 52, the fixing roller 520, the pressure roller 53, and a second supporting member 55.

The first supporting member 54 is a member which supports the heater 51. The second supporting member 55 is a member which supports the fixing belt 52, the fixing roller 520, and the pressure roller 53. The fixing belt 52 is supported by the second supporting member 55 via the fixing roller 520.

Figure 3:
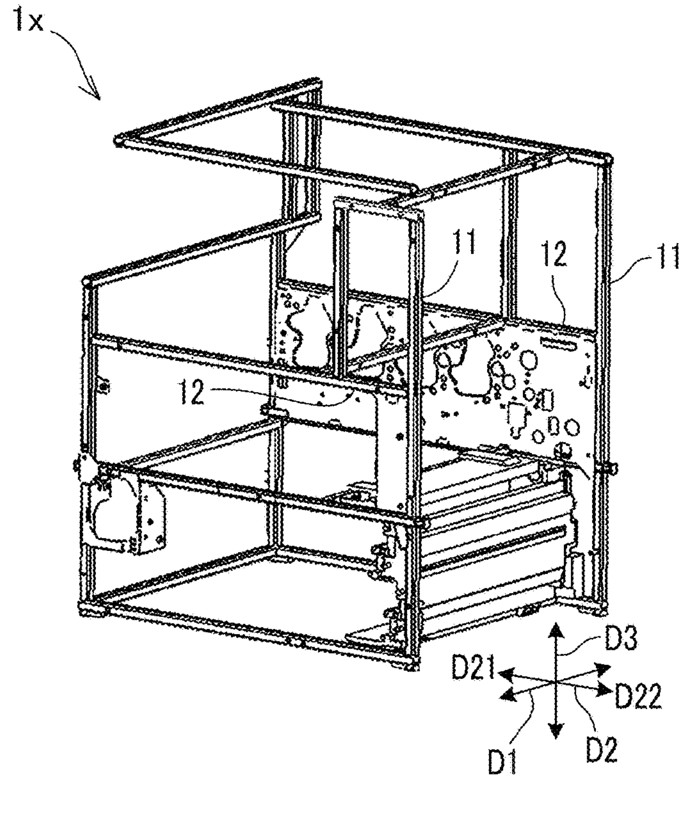
FIG. 3 is a perspective view of a main body frame in the image forming apparatus according to the embodiment.

The main body frame 1*x* is configured by a combination of a plurality of metal pipes (see FIG. 3). The heating unit 5*a* and the fixing unit 5*b* are supported by the main body frame 1*x*. The fixing unit 5*b* is arranged on the second side D22 of the second direction D2 with respect to the heating unit 5*a*.

The plurality of metal pipes configuring the main body frame 1*x* include restriction portions 11 and lower supporting portions 12 (see FIG. 3 to FIG. 5).

In the present embodiment, the restriction portions 11 are two supporting column pipes that are formed to extend in a longitudinal direction D3 and are arranged while being spaced apart from each other in the first direction D1 (see FIG. 3). The longitudinal direction D3 is an up-down direction.

The lower supporting portions 12 are two beam pipes that are formed to extend in the second direction D2 below the heating unit 5*a* and the fixing unit 5*b* and are arranged while being spaced apart from each other in the first direction D1 (see FIG. 3).

Figure 7:
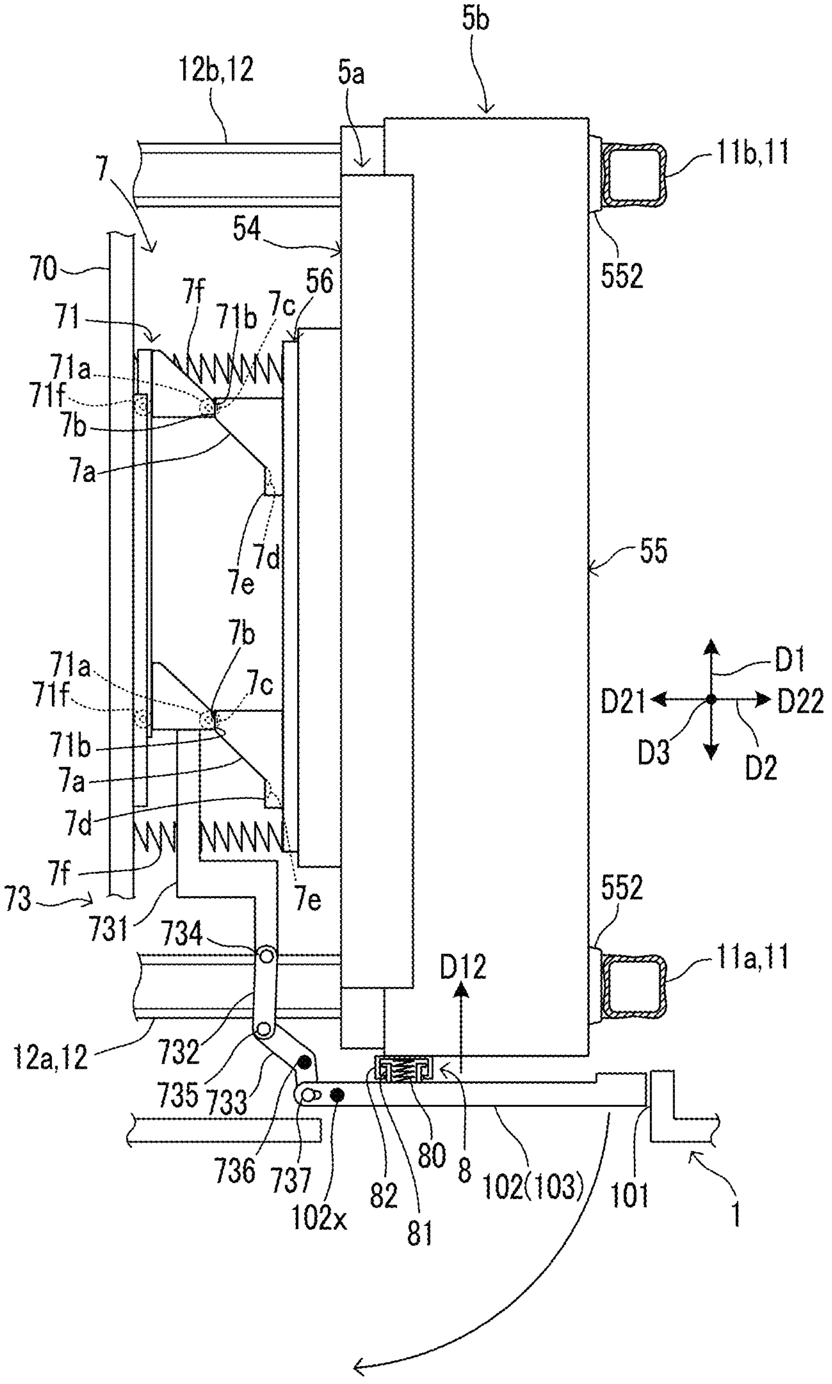
FIG. 7 is a plan view of the fixing device and an interlocking mechanism in a biased state in the image forming apparatus according to the embodiment.
Figure 8:
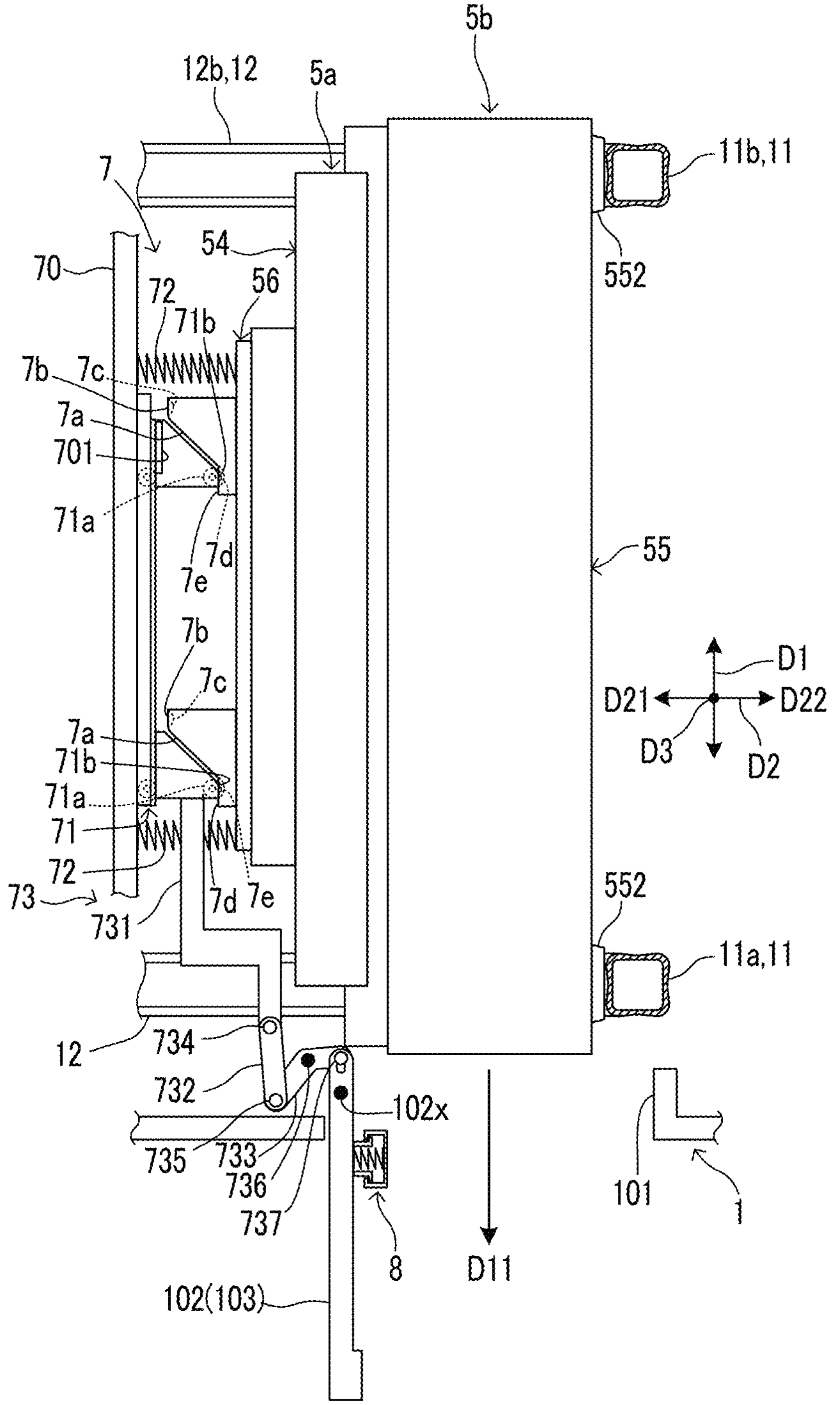
FIG. 8 is a plan view of the fixing device and the interlocking mechanism in a pulling state in the image forming apparatus according to the embodiment.

The heating unit 5*a* and the fixing unit 5*b* are mounted on the lower supporting portions 12 in a state where longitudinal directions thereof are provided along the first direction D1 (see FIG. 7 and FIG. 8). In other words, the lower supporting portions 12 support the heating unit 5*a* and the fixing unit 5*b* from below.

The heating unit 5*a* and the fixing unit 5*b* are movable on the lower supporting portions 12 along the second direction D2. The fixing unit 5*b* is arranged between the heating unit 5*a* and the restriction portions 11 (see FIG. 4 and FIG. 5).

By the heating unit 5*a* being moved to a position apart from the fixing unit 5*b*, the fixing unit 5*b* can be drawn out from the main body 1 along the first direction D1 (see FIG. 5 and FIG. 8).

The main body 1 is formed with an opening 101 (see FIG. 7 and FIG. 8). The opening 101 is a portion at which one end of the fixing unit 5*b* in the first direction D1 is opened to the outside of the main body 1. The image forming apparatus 10 includes a cover member 102 that is capable of opening and closing the opening 101 (see FIG. 7 and FIG. 8).

The cover member 102 is supported by a first supporting shaft 102*x*. Thus, the cover member 102 is rotatable about the first supporting shaft 102*x*. The cover member 102 is movable between a closing position at which the opening 101 is closed and an opening position at which the opening 101 is opened.

FIG. 7 shows the cover member 102 positioned at the closing position and the fixing device 5. FIG. 8 shows the cover member 102 positioned at the opening position and the fixing device 5.

When the cover member 102 is positioned at the closing position, the cover member 102 is retained at the closing position by a lock mechanism (not shown). By releasing the lock by the lock mechanism, the cover member 102 can rotate from the closing position to the opening position.

When the cover member 102 is positioned at the opening position, the fixing unit 5*b* can be drawn out from the main body 1 via the opening 101 (see FIG. 8).

Meanwhile, it is favorable for the heating unit 5*a* to be able to smoothly approach the fixing unit 5*b* or be spaced apart from the fixing unit 5*b*. The image forming apparatus 10 includes an interlocking mechanism 7 for causing the heating unit 5*a* to smoothly approach the fixing unit 5*b* or be spaced apart from the fixing unit 5*b* (see FIG. 7 and FIG. 8).

[Configuration of Interlocking Mechanism 7]

The image forming apparatus 10 includes the interlocking mechanism 7 and an operation member 103 coupled to the interlocking mechanism 7 (see FIG. 7 and FIG. 8). In the present embodiment, the cover member 102 doubles as the operation member 103.

By being operated, the operation member 103 is movable in a first operation direction or a second operation direction.

In the present embodiment, the first operation direction is a movement direction of the cover member 102 when closing the cover member 102. The second operation direction is a movement direction of the cover member 102 when opening the cover member 102.

That is, the first operation direction is a direction in which the cover member 102 moves when moving from the opening position to the closing position. The second operation direction is a direction in which the cover member 102 moves when moving from the closing position to the opening position.

The interlocking mechanism 7 causes the heating unit 5*a* to move along the second direction D2 in an interlocking manner with the movement of the operation member 103.

The interlocking mechanism 7 causes the heating unit 5*a* to move toward the second side D22 in an interlocking manner with the movement of the operation member 103 in the first operation direction (see FIG. 7). On the other hand, the interlocking mechanism 7 causes the heating unit 5*a* to move toward the first side D21 in an interlocking manner with the movement of the operation member 103 in the second operation direction (see FIG. 8).

The interlocking mechanism 7 includes a coupling member 56, a guide member 70, a movable member 71, bias members 72, and a first direction movement mechanism 73. The coupling member 56 is coupled to the first supporting member 54 of the heating unit 5*a*. The coupling member 56 configures a part of the heating unit 5*a*.

The bias members 72 bias the heating unit 5*a* toward the first side D21. Specifically, the bias members 72 are one or more elastic members that bias the heating unit 5*a* toward the first side D21. For example, the elastic member is a coil spring, a leaf spring, or the like.

In the examples shown in FIG. 7 and FIG. 8, the bias members 72 are two tension springs that elastically bias the heating unit 5*a* toward the first side D21.

The coupling member 56 includes tilted surfaces 7*a*. The tilted surfaces 7*a* are provided in the heating unit 5*a* while facing the first side D21. The tilted surfaces 7*a* are surfaces that are tilted from the second side D22 toward the first side D21 with respect to the first direction D1. In the present embodiment, the tilted surfaces 7*a* are provided at two positions spaced apart from each other in the first direction D1 (see FIG. 7 and FIG. 8).

The movable member 71 is supported while being movable along the first direction D1. The guide member 70 guides the movable member 71 along the first direction D1. For example, the guide member 70 is supported by the main body frame 1*x*.

Figure 9:
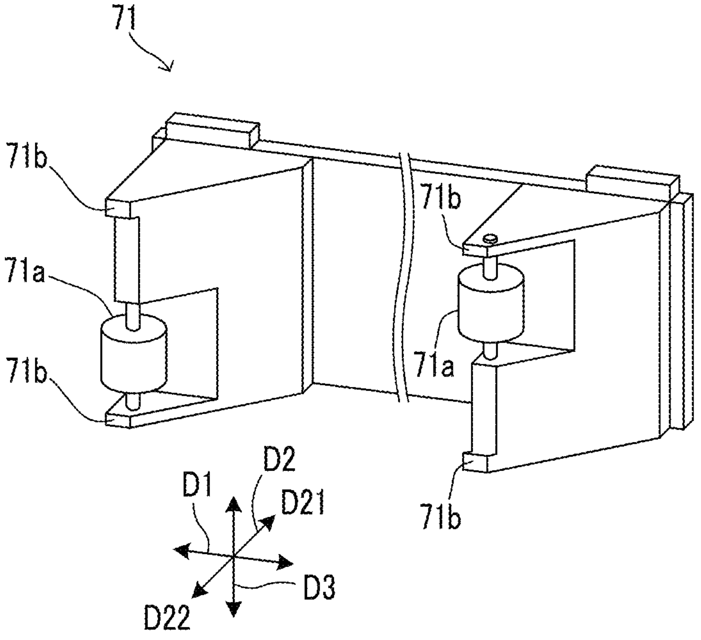
FIG. 9 is a perspective view in which a part of a movable member in the image forming apparatus according to the embodiment is omitted.

The movable member 71 includes one or more rollers 71*a* that are supported rotatably (see FIG. 7 to FIG. 9). The rollers 71*a* are provided at positions respectively corresponding to the tilted surfaces 7*a* in the movable member 71. In the present embodiment, the rollers 71*a* are provided at two positions spaced apart from each other in the first direction D1 (see FIG. 7 to FIG. 9). The rollers 71*a* roll while being in contact with the tilted surfaces 7*a*.

The first direction movement mechanism 73 causes the movable member 71 to move along the first direction D1 in an interlocking manner with the movement of the operation member 103. In the present embodiment, the first direction movement mechanism 73 is a link mechanism which converts the rotation of the operation member 103 into a linear operation along the first direction D1.

The first direction movement mechanism 73 includes a first link member 731, a second link member 732, and a third link member 733 (see FIG. 7 and FIG. 8).

One end of the first link member 731 is connected to the movable member 71, and the other end of the first link member 731 is coupled to one end of the second link member 732 by a first coupling shaft 734. The other end of the second link member 732 is connected to one end of the third link member 733 by a second coupling shaft 735. The other end of the third link member 733 is coupled to one end of the operation member 103 by a third coupling shaft 737.

The third link member 733 is rotatably supported by a second supporting shaft 736.

In the present embodiment, when moving the operation member 103 from the opening position to the closing position, the first direction movement mechanism 73 causes the movable member 71 to move toward a rear side along the first direction D1. Moreover, when moving the operation member 103 from the closing position to the opening position, the first direction movement mechanism 73 causes the movable member 71 to move toward a front side along the first direction D1.

As described above, the movement direction from the opening position to the closing position is the first operation direction. The movement direction from the closing position to the opening position is the second operation direction.

In descriptions below, an end portion of the tilted surface 7*a* on the second side D22 will be referred to as a base end portion of the tilted surface 7*a*, and an end portion of the tilted surface 7*a* on the first side D21 will be referred to as a terminal portion of the tilted surface 7*a*. The base end portion is an example of a portion of the tilted surface 7*a* on the second side D22. The terminal portion is an example of a portion of the tilted surface 7*a* on the first side D21.

When the movable member 71 moves in an interlocking manner with the movement of the operation member 103 in the first operation direction, the roller 71*a* rolls from the base end portion to the terminal portion on the tilted surface 7*a*. By rolling from the base end portion to the terminal portion on the tilted surface 7*a*, the roller 71*a* pushes the tilted surface 7*a* toward the second side D22. By pushing the tilted surface 7*a* toward the second side D22, the roller 71*a* causes the heating unit 5*a* to move toward the second side D22 against a bias force of the bias member 72.

Neither the heating unit 5*a* nor the fixing unit 5*b* is fixed to the main body frame 1*x* by a fixture such as a screw.

The restriction portions 11 restrict a movement range of the fixing unit 5*b* toward the second side D22. By the rollers 71*a* causing the heating unit 5*a* to move toward the second side D22, the fixing unit 5*b* and the heating unit 5*a* are sandwiched by the movable member 71 and the restriction portions 11 (see FIG. 4 and FIG. 7).

FIG. 7 shows the interlocking mechanism 7 in a biased state where the movable member 71 is biasing the heating unit 5*a* and the fixing unit 5*b* toward the restriction portions 11. FIG. 4 and FIG. 7 each show the fixing device 5 in a vicinity state where the heating unit 5*a* is retained in the vicinity of the fixing unit 5*b* by the interlocking mechanism 7.

By being sandwiched between the movable member 71 and the restriction portions 11, the fixing unit 5*b* and the heating unit 5*a* are positioned in the second direction D2.

In other words, when the movable member 71 moves in an interlocking manner with the movement of the operation member 103 in the first operation direction, the fixing unit 5*b* and the heating unit 5*a* are sandwiched by the movable member 71 and the restriction portions 11 to thus be positioned in the second direction D2.

The first supporting member 54 includes a plurality of concave first fitting portions 542 that are opened toward the second side D22 (see FIG. 4 and FIG. 5). The second supporting member 55 includes a plurality of convex second fitting portions 553 into which the plurality of first fitting portions 542 can be fit, respectively (see FIG. 4 and FIG. 5).

By the interlocking mechanism 7 causing the heating unit 5*a* to move toward the second side D22, the plurality of first fitting portions 542 and the plurality of second fitting portions 553 fit into one another (see FIG. 4).

By the fitting of the plurality of first fitting portions 542 and the plurality of second fitting portions 553, relative movements of the heating unit 5*a* and the fixing unit 5*b* in the longitudinal direction D3 are restricted.

It is noted that alternatively, the second supporting member 55 may include the plurality of first fitting portions 542, and the first supporting member 54 may include the plurality of second fitting portions 553.

Meanwhile, when the movable member 71 moves in an interlocking manner with the movement of the operation member 103 in the second operation direction, the roller 71*a* rolls from the terminal portion to the base end portion on the tilted surface 7*a*, and the bias member 72 causes the heating unit 5*a* to move toward the first side D21.

FIG. 8 shows the interlocking mechanism 7 in a pulling state where the bias member 72 is pulling the heating unit 5*a* toward the first side D21. FIG. 5 and FIG. 8 each show the fixing device 5 in a spaced state where the heating unit 5*a* is spaced apart from the fixing unit 5*b* toward the first side D21 by the interlocking mechanism 7.

In the present embodiment, the movable member 71 further includes first contact surfaces 71*b* (see FIG. 7 to FIG. 9). The coupling member 56 further includes second contact surfaces 7*b* respectively corresponding to the first contact surfaces 71*b* and first concave portions 7*c* respectively corresponding to the rollers 71*a* (see FIG. 7 and FIG. 8).

The first contact surfaces 71*b* are surfaces that face the second side D22 and are capable of coming into contact with the second contact surfaces 7*b* of the coupling member 56. For example, the first contact surfaces 71*b* are formed at three or more positions in the movable member 71. In the example shown in FIG. 9, the first contact surfaces 71*b* are formed at four positions in the movable member 71.

The second contact surfaces 7*b* are surfaces that face the first side D21 and are capable of coming into contact with the first contact surfaces 71*b* of the movable member 71. The second contact surfaces 7*b* are formed at positions respectively corresponding to the first contact surfaces 71*b* in the coupling member 56.

The first concave portions 7*c* face the first side D21 and are each arranged next to the terminal portion of the tilted surface 7*a* in the first direction D1 (see FIG. 7 and FIG. 8). The first concave portions 7*c* are provided at positions respectively corresponding to the rollers 71*a* in the coupling member 56. In the present embodiment, the first concave portions 7*c* are provided at two positions in the coupling member 56.

A part of the roller 71*a* can be inserted into the first concave portion 7*c*. Specifically, a part of the roller 71*a* including an edge on the second side D22 can be inserted into the first concave portion 7*c*.

When the movable member 71 moves in an interlocking manner with the movement of the operation member 103 in the first operation direction, the following first operation occurs. In the first operation, after the roller 71*a* rolls from the base end portion to the terminal portion on the tilted surface 7*a*, a part of the roller 71*a* enters the first concave portion 7*c*, and the first contact surface 71*b* is abutted against the second contact surface 7*b* (see FIG. 7).

By the first contact surfaces 71*b* being abutted against the second contact surfaces 7*b*, the fixing unit 5*b* and the heating unit 5*a* are sandwiched by the movable member 71 and the restriction portions 11. Thus, the fixing unit 5*b* and the heating unit 5*a* are positioned in the second direction D2.

In general, an allowance is formed between the roller 71*a* and a rotation shaft of the roller 71*a*. The fixing unit 5*b* and the heating unit 5*a* are positioned with high accuracy by being positioned in a state where the first contact surfaces 71*b* and the second contact surfaces 7*b* are in contact with one another.

Further, when the fixing unit 5*b* and the heating unit 5*a* are positioned by the contact of the first contact surfaces 71*b* and the second contact surfaces 7*b*, a large force is not applied to the rollers 71*a*. Therefore, durability of the rollers 71*a* is improved.

On the other hand, when the movable member 71 moves in an interlocking manner with the movement of the operation member 103 in the second operation direction, the following second operation occurs. In the second operation, after the rollers 71*a* are detached from the first concave portions 7*c* and the first contact surfaces 71*b* are spaced apart from the second contact surfaces 7*b*, the rollers 71*a* each roll from the terminal portion to the base end portion on the tilted surface 7*a* (see FIG. 8).

In the present embodiment, the coupling member 56 further includes third contact surfaces 7*d* respectively corresponding to the first contact surfaces 71*b* and second concave portions 7*e* respectively corresponding to the rollers 71*a* (see FIG. 7 and FIG. 8).

The third contact surfaces 7*d* are surfaces that face the first side D21 and are capable of coming into contact with the first contact surfaces 71*b* of the movable member 71. The third contact surfaces 7*d* are formed at positions respectively corresponding to the first contact surfaces 71*b* in the coupling member 56.

The second concave portions 7*e* face the first side D21 and are each arranged next to the base end portion of the tilted surface 7*a* in the first direction D1 (see FIG. 7 and FIG. 8). The second concave portions 7*e* are provided at positions respectively corresponding to the rollers 71*a* in the coupling member 56. In the present embodiment, the second concave portions 7*e* are provided at two positions in the coupling member 56.

A part of the roller 71*a* can be inserted into the second concave portion 7*e*. Specifically, a part of the roller 71*a* including an edge on the second side D22 can be inserted into the second concave portion 7*e*.

When the movable member 71 moves in an interlocking manner with the movement of the operation member 103 in the second operation direction, the following third operation occurs. In the third operation, after the roller 71*a* is detached from the first concave portion 7*c* and further rolls from the terminal portion to the base end portion on the tilted surface 7*a*, a part of the roller 71*a* enters the second concave portion 7*e*, and the first contact surface 71*b* is abutted against the third contact surface 7*d* (see FIG. 8).

Accordingly, when the heating unit 5*a* is spaced apart from the fixing unit 5*b* toward the first side D21, a force of the bias member 72 is not applied to the roller 71*a*. Therefore, durability of the rollers 71*a* is improved.

Meanwhile, when the movable member 71 moves in an interlocking manner with the movement of the operation member 103 in the first operation direction, the following fourth operation occurs. In the fourth operation, after the roller 71*a* is detached from the second concave portion 7*e* and the first contact surface 71*b* is spaced apart from the third contact surface 7*d*, the roller 71*a* rolls from the base end portion to the terminal portion on the tilted surface 7*a* (see FIG. 7).

In the image forming apparatus 10, the heating unit 5*a* can smoothly approach the fixing unit 5*b* or be spaced apart from the fixing unit 5*b* by actions of the rollers 71*a*.

In the present embodiment, the movable member 71 further includes rollers 71*f* (see FIG. 7). The rollers 71*f* are in contact with the guide member 70. When the movable member 71 moves along the first direction D1, the rollers 71*f* roll on a surface of the guide member 70.

By actions of the rollers 71*f*, the heating unit 5*a* can more smoothly approach the fixing unit 5*b* or be spaced apart from the fixing unit 5*b*.

Figure 6:
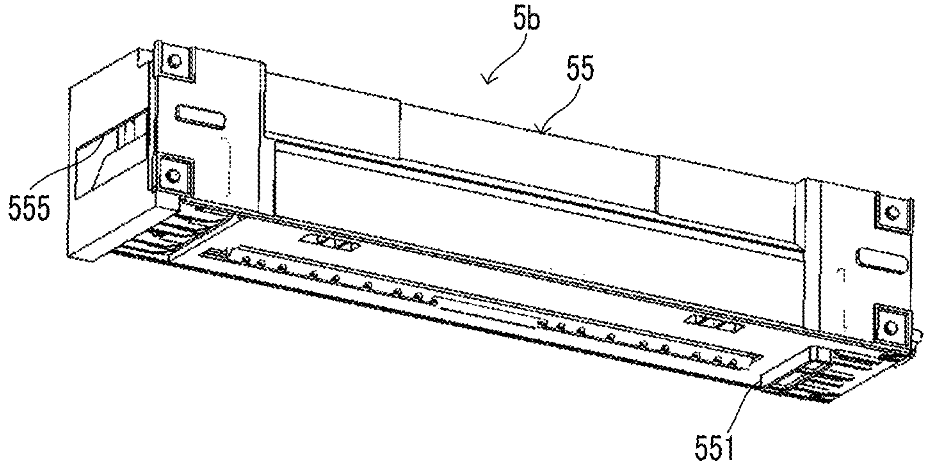
FIG. 6 is a perspective view of a fixing unit in the image forming apparatus according to the embodiment.

In addition, the image forming apparatus 10 further includes a first direction bias mechanism 8 that is attached to an inner surface of the cover member 102 (see FIG. 7 and FIG. 8). Further, the second supporting member 55 of the fixing unit 5*b* includes protrusion portions 551 that protrude from a lower surface of the second supporting member 55 (see FIG. 4 to FIG. 6).

The first direction bias mechanism 8 includes a spring 80, a spring case 81, and a cap portion 82 (see FIG. 7).

The spring case 81 houses the spring 80. The cap portion 82 is attached while being movable with respect to the spring case 81. The spring 80 is an example of the elastic member.

When the cover member 102 is positioned at the closing position, the spring 80 is sandwiched between the cover member 102 and the second supporting member 55 of the fixing unit 5*b*. In the present embodiment, the spring 80 and the cap portion 82 are sandwiched between the cover member 102 and the second supporting member 55.

By being sandwiched between the cover member 102 and the second supporting member 55, the spring 80 biases the second supporting member 55 in an attachment direction D12 by the elastic force (see FIG. 7). The attachment direction D12 is a direction opposite to a drawing direction D11 of the fixing unit 5*b*.

Furthermore, by the force that the second supporting member 55 receives from the spring 80 when the cover member 102 is positioned at the closing position, the protrusion portions 551 are abutted against the lower supporting portions 12.

By the actions of the spring 80 and the protrusion portions 551, the fixing unit 5*b* is positioned in the first direction D1. It is noted that the first direction bias mechanism 8 may alternatively be attached to the second supporting member 55 of the fixing unit 5*b*.

NOTES OF DISCLOSURE

Hereinafter, a general outline of the disclosure extracted from the embodiment described above will be noted. It is noted that the respective configurations and processing functions described in the notes below can be sorted and arbitrarily combined as appropriate.

Note 1

An image forming apparatus, including:

a main body in which an opening is formed;

an operation member which is movable in a first operation direction or a second operation direction by being operated;

a fixing unit which includes a fixing member and a pressure member that biases a sheet toward the fixing member, is arranged inside the main body, and is capable of being drawn out along a first direction from the main body via the opening;

a heating unit which includes a heater that heats the fixing member, is arranged on a first side of a second direction that intersects with the first direction with respect to the fixing unit in the main body, and is movable along the second direction; and an interlocking mechanism which causes the heating unit to move along the second direction in an interlocking manner with a movement of the operation member, in which the interlocking mechanism includes a tilted surface which is provided in the heating unit while facing the first side and is tilted from a second side of the second direction toward the first side with respect to the first direction, a bias member which biases the heating unit toward the first side, a movable member which includes a roller that is supported rotatably and comes into contact with the tilted surface, and is movable along the first direction, and a first direction movement mechanism which causes the movable member to move along the first direction in the interlocking manner with the movement of the operation member, when the movable member moves in the interlocking manner with the movement of the operation member in the first operation direction, the roller rolls from a portion of the tilted surface on the second side to a portion thereof on the first side to cause the heating unit to move toward the second side against a bias force of the bias member, and when the movable member moves in the interlocking manner with the movement of the operation member in the second operation direction, the roller rolls from the portion of the tilted surface on the first side to the portion thereof on the second side, and the bias member causes the heating unit to move toward the first side.

Note 2

The image forming apparatus according to note 1, in which the movable member includes a first contact surface that faces the second side and is capable of coming into contact with a part of the heating unit, the heating unit includes a concave portion which faces the first side, is arranged next to an end portion of the tilted surface on the first side in the first direction, and into which a part of the roller can be inserted, and a second contact surface which faces the first side and is capable of coming into contact with the first contact surface, when the movable member moves in the interlocking manner with the movement of the operation member in the first operation direction, the part of the roller enters the concave portion and the first contact surface is abutted against the second contact surface after the roller rolls from the portion of the tilted surface on the second side to the portion thereof on the first side, and when the movable member moves in the interlocking manner with the movement of the operation member in the second operation direction, the roller rolls from the portion of the tilted surface on the first side to the portion thereof on the second side after the roller is detached from the concave portion and the first contact surface is spaced apart from the second contact surface.

Note 3

The image forming apparatus according to note 1 or 2, in which the main body includes a lower supporting portion which supports the fixing unit and the heating unit from below, and a restriction portion which restricts a movement range of the fixing unit toward the second side, and when the movable member moves in the interlocking manner with the movement of the operation member in the first operation direction, the fixing unit and the heating unit are sandwiched by the restriction portion and the movable member to be positioned in the second direction.

Note 4

The image forming apparatus according to any one of notes 1 to 3, including:

a cover member which is capable of opening and closing the opening and doubles as the operation member, in which the first operation direction is a movement direction of the cover member when closing the cover member, and the second operation direction is a movement direction of the cover member when opening the cover member.

Note 5

The image forming apparatus according to any one of notes 1 to 4, in which the heater is a heating device that uses an induction heating system.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus, comprising:

a main body in which an opening is formed;

an operation member which is movable in a first operation direction or a second operation direction by being operated;

a fixing unit which includes a fixing member and a pressure member that biases a sheet toward the fixing member, is arranged inside the main body, and is capable of being drawn out along a first direction from the main body via the opening;

a heating unit which includes a heater that heats the fixing member, is arranged on a first side of a second direction that intersects with the first direction with respect to the fixing unit in the main body, and is movable along the second direction; and an interlocking mechanism which causes the heating unit to move along the second direction in an interlocking manner with a movement of the operation member, wherein the interlocking mechanism includes a tilted surface which is provided in the heating unit while facing the first side and is tilted from a second side of the second direction toward the first side with respect to the first direction, a bias member which biases the heating unit toward the first side, a movable member which includes a roller that is supported rotatably and comes into contact with the tilted surface, and is movable along the first direction, and a first direction movement mechanism which causes the movable member to move along the first direction in the interlocking manner with the movement of the operation member, when the movable member moves in the interlocking manner with the movement of the operation member in the first operation direction, the roller rolls from a portion of the tilted surface on the second side to a portion thereof on the first side to cause the heating unit to move toward the second side against a bias force of the bias member, and when the movable member moves in the interlocking manner with the movement of the operation member in the second operation direction, the roller rolls from the portion of the tilted surface on the first side to the portion thereof on the second side, and the bias member causes the heating unit to move toward the first side.

2. The image forming apparatus according to claim 1, wherein the movable member includes a first contact surface that faces the second side and is capable of coming into contact with a part of the heating unit, the heating unit includes a concave portion which faces the first side, is arranged next to an end portion of the tilted surface on the first side in the first direction, and into which a part of the roller can be inserted, and a second contact surface which faces the first side and is capable of coming into contact with the first contact surface, when the movable member moves in the interlocking manner with the movement of the operation member in the first operation direction, the part of the roller enters the concave portion and the first contact surface is abutted against the second contact surface after the roller rolls from the portion of the tilted surface on the second side to the portion thereof on the first side, and when the movable member moves in the interlocking manner with the movement of the operation member in the second operation direction, the roller rolls from the portion of the tilted surface on the first side to the portion thereof on the second side after the roller is detached from the concave portion and the first contact surface is spaced apart from the second contact surface.

3. The image forming apparatus according to claim 1, wherein the main body includes a lower supporting portion which supports the fixing unit and the heating unit from below, and a restriction portion which restricts a movement range of the fixing unit toward the second side, and when the movable member moves in the interlocking manner with the movement of the operation member in the first operation direction, the fixing unit and the heating unit are sandwiched by the restriction portion and the movable member to be positioned in the second direction.

4. The image forming apparatus according to claim 1, comprising:

a cover member which is capable of opening and closing the opening and doubles as the operation member, wherein the first operation direction is a movement direction of the cover member when closing the cover member, and the second operation direction is a movement direction of the cover member when opening the cover member.

5. The image forming apparatus according to claim 1, wherein the heater is a heating device that uses an induction heating system.

* * * * *